Patented June 28, 1932

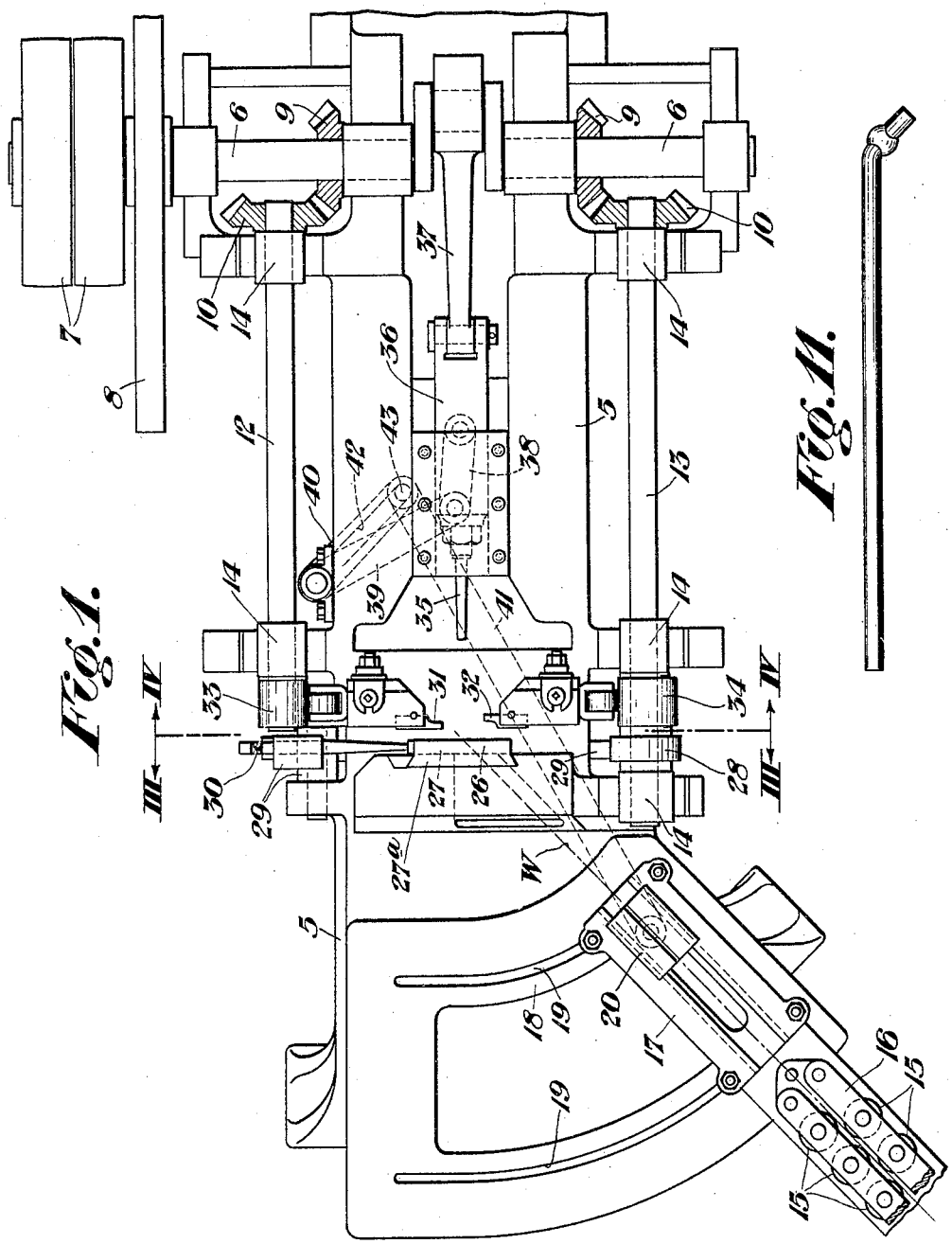

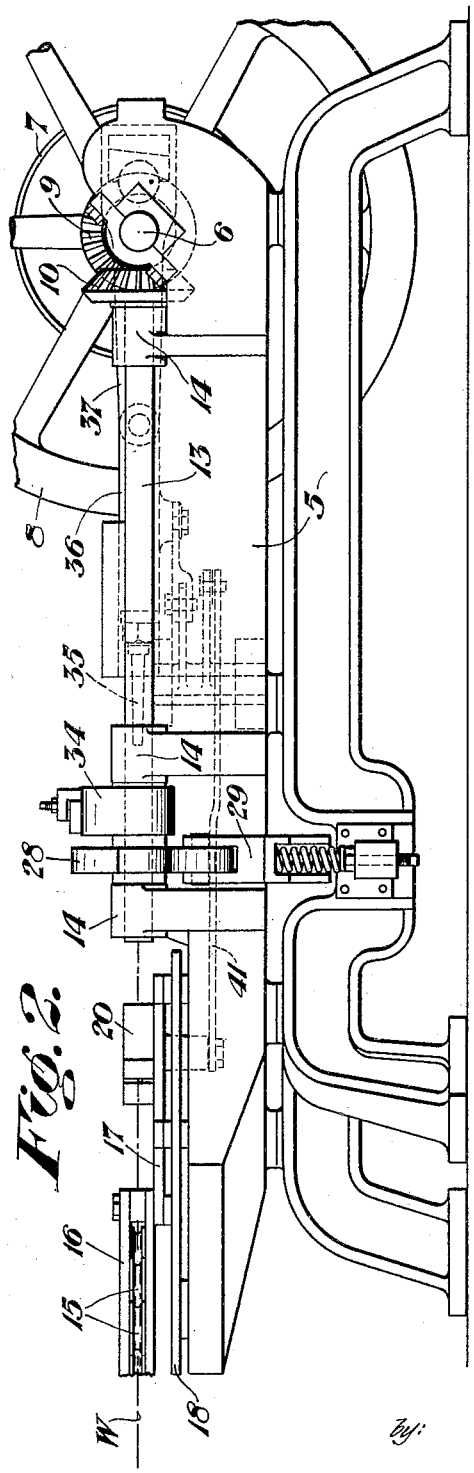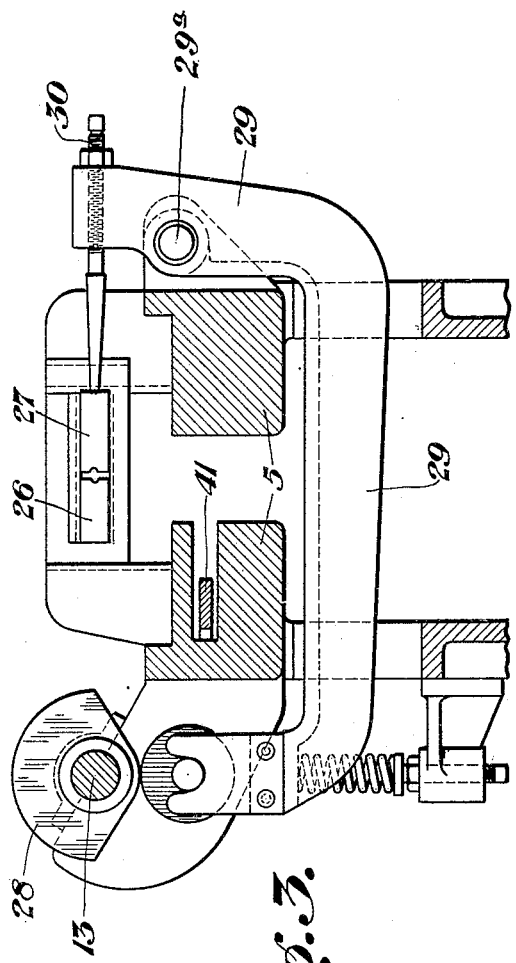

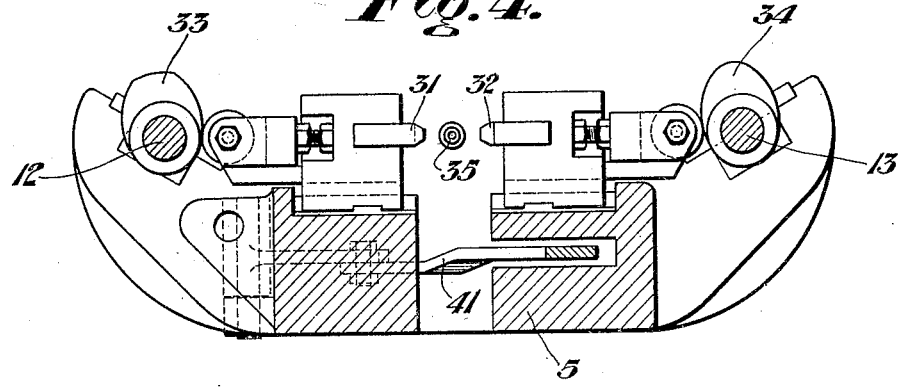
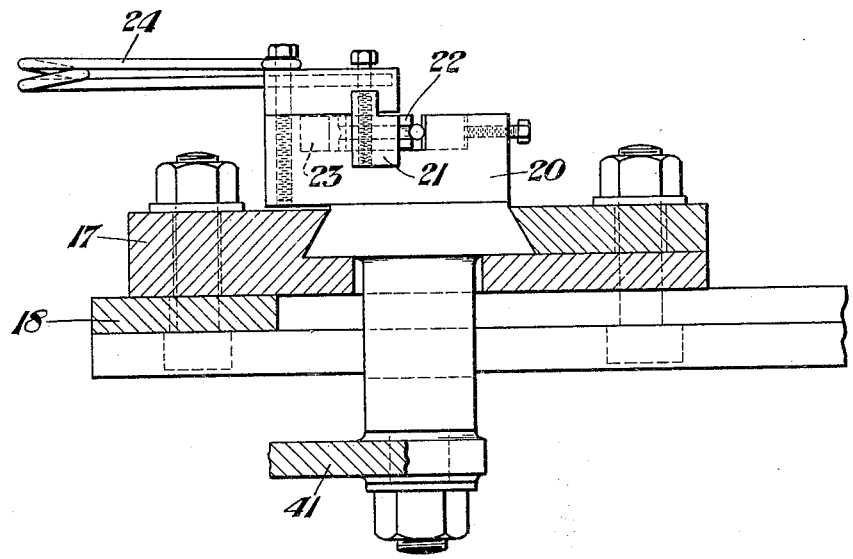

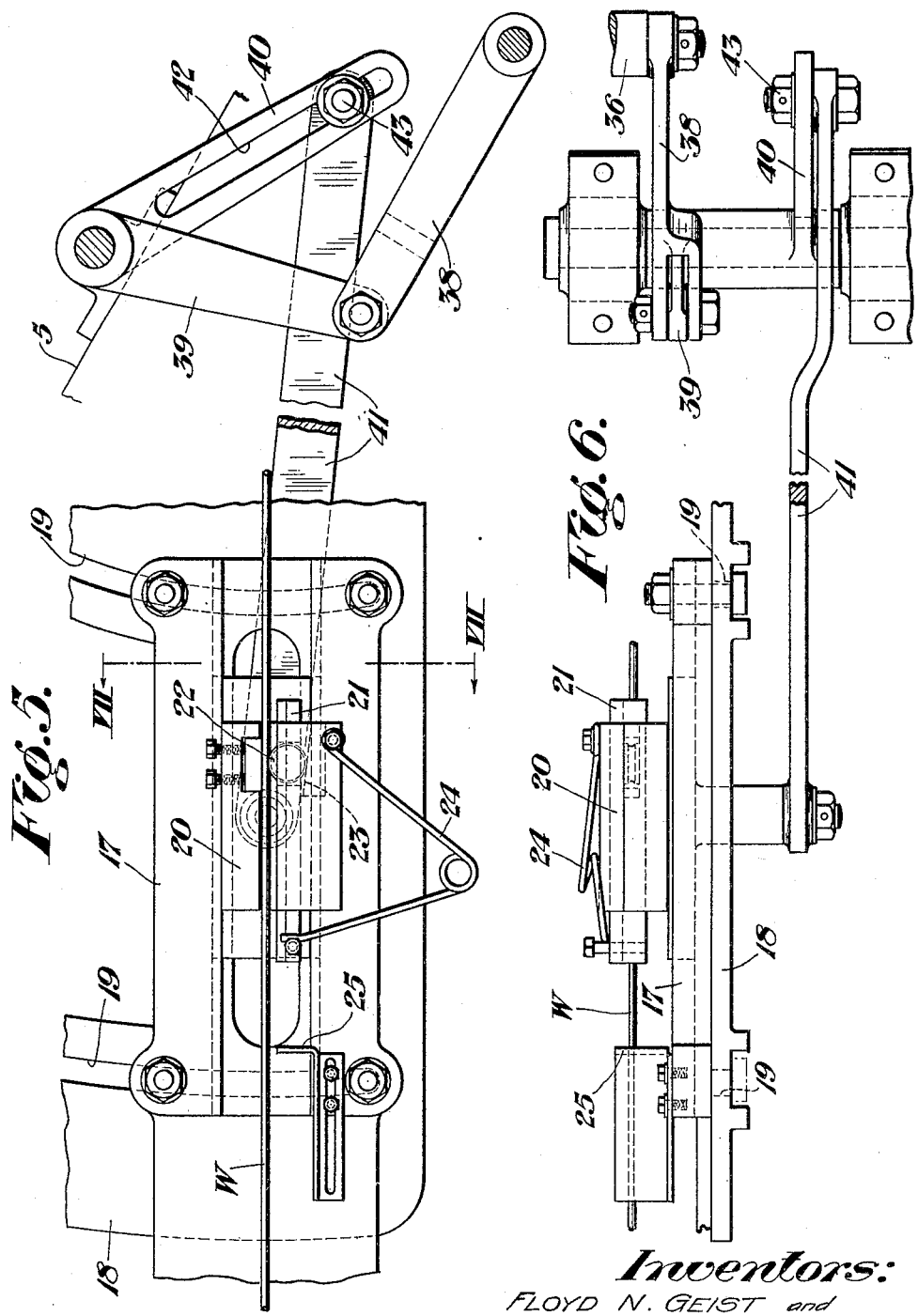

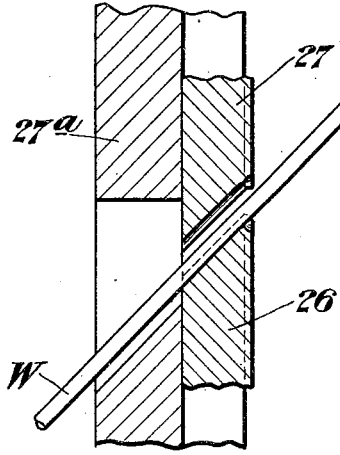
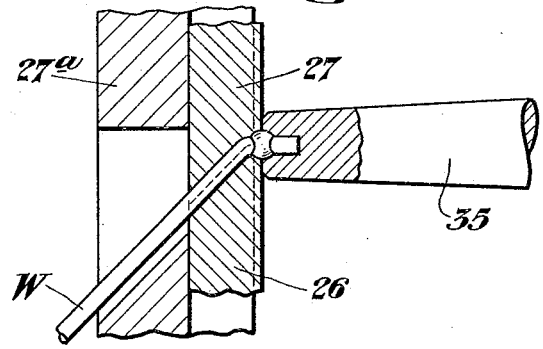
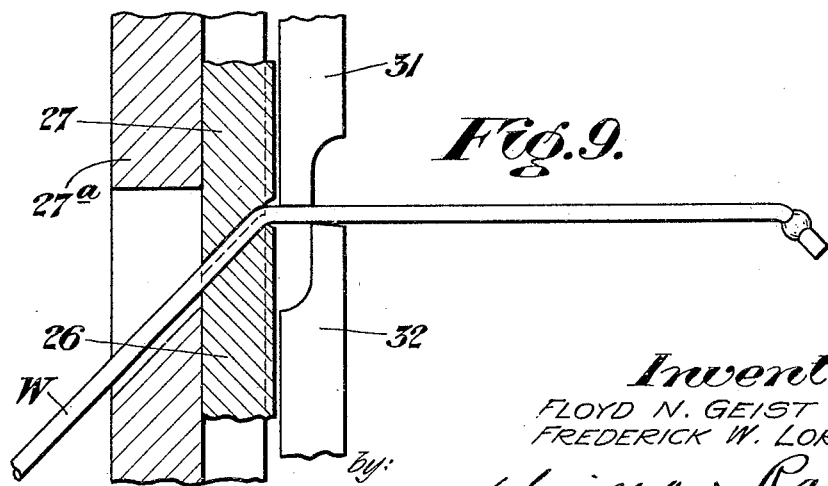

1,865,412

UNITED STATES PATENT OFFICE

FLOYD N. GEIST AND FREDERICK W. LORENZ, OF CLEVELAND HEIGHTS, OHIO

SPOKE MAKING APPARATUS

Application filed December 24, 1930. Serial No. 504,580.

This invention relates to a machine for making wire spokes and analogous wire or rod products wherein the head of the spoke is formed at an angle to the shank or body portion.

The machine is automatic in operation and adjustable to produce spokes of varying lengths with heads bent at varying angles as required, a particular type of adjustable feed device being employed which feeds the wire or rod stock into the machine at an angle to the normal plane of projection of the head of the spoke, the wire then being bent, cut and the head formed on the spoke.

To obtain an understanding of the invention and the features of novelty resident therein, reference is had to the accompanying drawings, wherein:

Figure 1 is a plan view of the machine;

Fig. 2 is a view in side elevation;

Figs. 3 and 4 are sectional views taken, respectively, on the lines III—III and IV—IV, Fig. 1;

Fig. 5 is an enlarged fragmentary view in broken plan of the feeder block portion of the machine and cooperating mechanism;

Fig. 6 is a view in side elevation of Fig. 5;

Fig. 7 is a sectional view taken on the line VII—VII, Fig. 5;

Figs. 8, 9 and 10 are views in plan illustrating the operations of the pinch and forming dies, bending and cutting dies and head forming devices; and Fig. 11 is a view of the finished product.

The base frame of the machine is indicated at 5 and has mounted thereon a drive shaft 6, which is provided with pulleys 7, one of which is loose and the other fixed, and fly wheel 8. The shaft 6 is formed with a crank and is provided with bevel gears 9 which mesh with gears 10 on cam shafts 12 and 13, which are shown mounted on opposite sides of the machine in bearings 14.

The wire stock is fed into the machine through a set of straightener rolls 15 mounted in a bracket 16, which is adjustably secured at one extremity in a guide bracket 17, the latter in turn being mounted for arcuate or angular adjustment in a bed plate 18, which is formed with arcuate slots 19, to provide for such adjustment.

In the guide bracket 17 is mounted a slidable feed block 20, note particularly Figs. 5, 6 and 7, the wire, indicated at W, being advanced with this block, and mounted to slide in said block is a release bar 21. A wire gripping or feed roll 22 is disposed in a recessed portion of the bar 21 and bears at one side against a tapered member or wedge 23 which may be seated in or found as part of the slide block 20, the roll being normally held in gripping relation with the wire by a spring 24, which is secured at one end to the block 20 and at its opposite end to the release bar 21. A stop 25 is adjustably secured to the guide bracket 17 and has its end bent at an angle and projecting into the path of the release bar 21 as the block 20 is reciprocated by means to be described. As the feeder block 20 moves rearwardly the roll 22 will move forwardly relative to the wedge 23 and the wire so as to permit block 20 to move rearwardly relative to the wire. During the rearward movement of the block 20 the bar 21 will encounter a stop 25 and the bar 21 and roller 22 will be moved forwardly relative to the wedge 23 and block 20 during the remainder of the rearward movement of the block 20. The roll 22 will thus be held out of gripping or feeding engagement with the wire until the block 20 is again moved forwardly to a point where the bar 21 is free of the stop 25, whereupon the spring 24 forces the bar 21 and roll 22 back into gripping relation with the wire.

By adjusting the position of the stop 25 the length of wire fed into the machine can be adjusted very closely, and a further approximate adjustment may be made by adjusting the stroke of the block 20 by the means hereinafter described.

By adjusting the position of the stop 25, the lengths of the spokes can be varied as desired.

As the wire is advanced by the feed block 20 it passes between a fixed pinch and forming die 26 and a movable pinch and forming die 27 mounted in a die block 27a, the die 27 being operated by means of a cam 28, which is mounted on the shaft 13 and acts on a lever 29 which is pivotally mounted or fulcrumed on a stub-shaft 29a, note particularly Fig. 3, the stroke of the die being adjusted by means of screw 30. The wire is pinched between the dies 26 and 27 and bent slightly at an angle.

When the wire is advanced between the pinch and forming dies 26 and 27, it also lies between a bending die 31 and a cutting die 32, see Fig. 4, the die 31 being actuated by cam 33 and the die 32 by a cam 34, said cams being mounted on the cam shafts 12 and 13. The bending die 31 bends the wire to the desired angle, and the cutting die 32 then moves in and severs the wire, the strokes of both dies being adjustable to adjust the angle of bend and the point of severance.

The dies 31 and 32 move back, and the severed partly formed spoke is held between the pinch dies 26 and 27, the wire as here shown being severed with a squared end. This projecting end is then struck by a hammer 35, which is carried by a hammer stock on a cross-head 36, the latter being pivotally secured to a connecting rod 37 which is journaled on the crank portion of the shaft 6. The head of the spoke is formed by the hammer.

The stroke of the hammer also operates the feeder block 20, the latter being connected to the hammer stock by means of links or lever arms 38, 39 and 40 and connecting rod 41, the link 38 being pivotally connected to said stock and the rod 41 extending back and being pivotally connected to the block 20 as particularly shown in Fig. 6.

Adjustment of the stroke of the block is provided by means of slot 42 formed in link 40, pivoting bolt 43 for bar or rod 41 being adjustable along said slot, a shoulder being formed on the bolt 43 to allow tightening of the securing nut without binding the pivotal connection.

The operation of the machine will be apparent from the foregoing description particularly when taken in conjunction with Figs. 8, 9 and 10 of the drawings. The wire is fed into the machine through straightener rolls 15 and feeder block 20. Assuming that the block 20 has been adjusted to give the head of the spoke the desired angle and that the length of the spoke has been adjusted by adjusting the position of the stop 25 and/or the stroke of the connecting rod 41 in slot 42, as the feed block moves back, the release bar contacts with the stop 25 and the grip roll 22 releases the wire, as heretofore described. As the block moves forward, the roll grips the wire and feeds it forward the desired distance with its forward extremity lying between the pinch and forming dies 26 and 27 and bending and cutting dies 31 and 32, as shown in Figs. 8 and 9. The wire is gripped and held fast by the dies 26 and 27, and the bending die 31 then moves over and bends the wire to give the head of the spoke the proper angle, note Fig. 9. Cutting die 32 then severs the wire and the dies 31 and 32 retract. The hammer 35 then moves forward and strikes the projecting wire end and forms the head on the spoke, it being of course understood that the severed spoke has dropped down out of the way of the hammer. The finished product is shown in Fig. 11.

We claim:

1. In a machine for making wire spokes, cooperating die and head-forming members, a wire feeding device for feeding stock material to said members, said device comprising an angularly adjustable guide bracket, a reciprocating feed block mounted in said bracket, a wire gripping roll cooperating with said block, and a release bar cooperating with said roll.

2. In a machine for making wire spokes, cooperating die and head-forming members, a reciprocating wire feeding device for feeding stock material to said members, a wire gripping roll cooperating with said device, a release bar cooperating with said roll, and an adjustable contact member mounted adjacent the path of reciprocation of said device and adapted to contact with said bar for determining the point at which said roll grips the wire.

3. In a machine for making wire spokes, a set of pinch and forming dies, means for feeding wire stock between said dies at an angle thereto, a bending die adapted to bend the wire in substantially axial alinement with said pinch dies and a cutting die cooperating with said bending die for cutting the wire beyond said pinch dies, leaving sufficient material to form the head of the spoke, and a reciprocating hammer for forming the head, said hammer being connected to said feeding means for reciprocating the latter.

4. In a machine for making wire spokes, cooperating pinch and forming dies, a reciprocating feed device for feeding wire stock to said dies, a reciprocating head-forming hammer having a pivoted lever connection to said feed device for reciprocating the latter, and means for adjusting the stroke of said levers to thereby adjust the extent of reciprocation of said feed device.

5. In a machine for making wire spokes, a set of pinch and forming dies, means for feeding wire stock between said dies at an angle thereto, means for permitting adjustment of said feeding means so as to feed said wire stock at various angles relative to said dies, a bending die adapted to bend the wire in substantially axial alinement with said pinch dies and a cutting die cooperating with said bending die for cutting wire beyond said pinch dies, leaving sufficient material to form a head of the spoke, and a reciprocating hammer for forming the head, said hammer being connected to said feeding means for reciprocating the latter.

6. In a machine for making wire spokes a set of pinch forming dies, reciprocating means for feeding wire stock between said dies at an angle thereto, means for permitting adjustment of said feeding means so as to feed said wire stock at various angles relative to said dies, a bending die adapted to bend the wire in substantially axial alinement with said bending die for cutting the wire beyond said pinch dies, leaving sufficient material to form the head of the spoke, a reciprocating head-forming hammer having a pivoted lever connected to said feeding means for reciprocating the latter and means for adjusting the stroke of said levers to thereby vary the stroke of said feeding means.

7. In a machine for making wire spokes cooperating pinch and forming dies, a reciprocating wire feeding device for feeding stock material to said dies, a reciprocating head-forming hammer, a wire gripping roll cooperating with said feeding device, a release bar cooperating with said roll, adjustable means forming an operative connection between said feeding device and said hammer, means for adjusting said last named means to vary the stroke of said feeding means, and an adjustable contact member mounted adjacent the path of reciprocation of said feeding device and adapted to contact with said bar for determining the point at which said roll grips the wire.

In testimony whereof, we have hereunto set our hands.

FLOYD N. GEIST.
FREDERICK W. LORENZ.